United States Patent
Hu et al.

(10) Patent No.: US 10,618,841 B2
(45) Date of Patent: Apr. 14, 2020

(54) ON-LINE METHOD FOR STABILIZING SURFACE COMPRESSIVE STRESS OF CHEMICALLY-TEMPERED GLASS

(71) Applicant: Chongqing Liangjiang New District XiaMeixi Technology Partnership Enterprise (Limited Partnership), Chongqing (CN)

(72) Inventors: Wei Hu, Shenzhen (CN); Baoquan Tan, Shenzhen (CN); Fanghua Chen, Shenzhen (CN); Jianbin Feng, Shenzhen (CN); Zhenyu Chen, Shenzhen (CN)

(73) Assignee: CHONGQING LIANGJIANG NEW DISTRICT XIAMEIXI TECHNOLOGY PARTNERSHIP ENTERPRISE (LIMITED PARTNERSHIP), Chongqing (CN)

( * ) Notice: Subject to any disclaimer, the term of this patent is extended or adjusted under 35 U.S.C. 154(b) by 4 days.

(21) Appl. No.: 15/800,122

(22) Filed: Nov. 1, 2017

(65) Prior Publication Data

US 2018/0057402 A1 Mar. 1, 2018

Related U.S. Application Data

(63) Continuation of application No. PCT/CN2017/099520, filed on Aug. 29, 2017.

(30) Foreign Application Priority Data

Aug. 30, 2016 (CN) .......................... 2016 1 0780982

(51) Int. Cl.
*C03C 21/00* (2006.01)
*C03B 27/03* (2006.01)

(52) U.S. Cl.
CPC ............ *C03C 21/002* (2013.01); *C03B 27/03* (2013.01)

(58) Field of Classification Search
CPC ..... C03C 21/001; C03C 21/002; C03B 27/01; C03B 27/03
See application file for complete search history.

(56) References Cited

U.S. PATENT DOCUMENTS

2005/0162956 A1* 7/2005 Ikenishi .................. C03C 3/085
365/222

FOREIGN PATENT DOCUMENTS

CN 104788013 A * 7/2015
CN 204702649 U * 10/2015

* cited by examiner

*Primary Examiner* — Joseph S Del Sole
*Assistant Examiner* — Mohamed K Ahmed Ali

(57) ABSTRACT

The present invention provides an on-line method for stabilizing surface compressive stress of chemically-tempered glass, which comprises the steps of: placing glass to be tempered together with a stabilizer in a tempering furnace containing a molten salt bath for glass tempering; and after reacting at a temperature for a period of time, removing the glass and the stabilizer from the tempering furnace. The stabilizer is capable of chemically reacting with impurity ions in the molten salt bath for glass tempering, to remove the impurity ions in the molten salt bath. Therefore, the presence of the stabilizer allows the impurity ion content in the molten salt bath for glass tempering to be stable without gradual accumulation.

7 Claims, No Drawings

ON-LINE METHOD FOR STABILIZING SURFACE COMPRESSIVE STRESS OF CHEMICALLY-TEMPERED GLASS

CROSS-REFERENCE TO RELATED APPLICATIONS

This application is a continuation application of PCT Application No. PCT/CN2017/099520 filed on Aug. 29, 2017 which claims priority to Chinese Application No. 201610780982.X filed on Aug. 30, 2016, the entire contents of which are hereby incorporated by reference.

TECHNICAL FIELD

The present invention relates to the chemical tempering technology of glass, particularly to a method for chemically tempering glass in a molten salt bath containing potassium nitrate, and more specifically to an on-line method for stabilizing surface compressive stress of chemically-tempered glass.

BACKGROUND

In the glass processing industry, chemical tempering technology is often used to improve the strength of ordinary glass. The principle includes: placing glass or a glass product needed to be tempered in a molten salt bath containing potassium nitrate melted at a high temperature, soaking it for a period of time, and forming a compressive stress layer on the glass surface by replacing sodium and lithium ions of small ion radius in the glass with potassium ions of large ion radius in the molten salt bath containing potassium nitrate, so as to achieve the purpose of improving the glass strength.

Surface compressive stress (CS) is often used as an indicator by those skilled in the art to evaluate the chemical tempering effect of glass. Test results show that the higher the purity of potassium nitrate in the molten salt bath containing potassium nitrate is, the higher the CS value of the tempered glass will be, and the better the chemical tempering effect of the glass will be. On the contrary, when the purity of potassium nitrate in the molten salt bath containing potassium nitrate is lowered, the CS value of the tempered glass is reduced, and the chemical tempering effect of the glass becomes poor. The analysis results show that the main reason for the decrease of the CS value is that the molten salt bath containing potassium nitrate is diluted and contaminated by sodium and ions released from the glass due to ion exchange. With increasing area of glass treated with the molten salt bath containing potassium nitrate, the concentration of sodium and lithium ions in the molten salt bath containing potassium nitrate increases gradually, and the concentration of potassium nitrate in the molten salt bath containing potassium nitrate decreases gradually, resulting in the decrease of the CS value of the tempered glass.

At present, in order to obtain tempered glass with desired CS value, a commonly employed approach is to remove the purity-lowered molten salt bath containing potassium nitrate and replace it with fresh molten salt bath containing potassium nitrate. The drawbacks of this approach include the following.

1) The low-purity molten salt bath containing potassium nitrate is discarded as a waste. When cooled from about 400° C. to normal temperature, the molten salt bath containing potassium nitrate discarded as a waste changes from the molten state to a strongly hard mass that is difficult to be broken. If potassium nitrate discarded as a waste is intended to be recovered, it needs to be broken and melted at a high temperature by the potassium nitrate manufacturers before recovery and purification, which is accompanied by high energy consumption, waste of resources, and high cost.

2) The replacement of the molten salt bath containing potassium nitrate involves: shutting down the operation to clean the spent molten salt bath and the inner wall of the chemical tempering furnace, adding the salt bath containing potassium nitrate, melting by heating, and maintaining the temperature. The production has to be shut down for 4 to 5 days during the whole process from replacing the molten salt bath to reproduction, resulting in the decrease in the operation rate of the equipment (the ratio of possible yield of a machine to actual yield) and the decrease in the actual productivity.

3) The consumption of the molten salt bath containing potassium nitrate is a main cost in the production of chemically tempered glass. As the glass strength requirement is increased, the frequency of replacement of the molten salt bath containing potassium nitrate is increased, and the cost of the chemically tempered glass is accordingly increased.

Therefore, to reduce the frequency of replacement and improve the utilization of the molten salt bath containing potassium nitrate and thus reduce the cost and create economic benefits for an enterprise, there is a need to develop an on-line method for stabilizing surface compressive stress of chemically tempered glass.

SUMMARY OF THE INVENTION

In view of the problem of lowered CS value of tempered glass caused by gradually increased sodium and lithium ion concentrations and gradually decreased potassium nitrate concentration in a molten salt bath containing potassium nitrate with increasing area of glass treated with the molten salt bath containing potassium nitrate in a practical chemical tempering process of glass, the present invention provides an on-line method for stabilizing surface compressive stress of chemically-tempered glass, in which the sodium ion content in the molten salt bath containing potassium nitrate can be stabilized by periodically adding a stabilizer to the molten salt bath containing potassium nitrate, thus ensuring that the CS value of the chemically-tempered glass is stabilized in a required range, and solving the problem of frequent replacement of the molten salt bath in the production of chemically-tempered glass.

The technical solution provided in the present invention is as follows.

The present invention provides an on-line method for stabilizing surface compressive stress of chemically-tempered glass, which comprises the steps of:

placing glass to be tempered together with a stabilizer in a tempering furnace containing a molten salt bath for glass tempering; and after reacting at a temperature for a period of time, removing the glass and the stabilizer from the tempering furnace.

In the method for stabilizing surface compressive stress of chemically-tempered glass provided in the present invention, the stabilizer is present in an amount of 0.3-2% w/w of the molten salt bath for glass tempering.

The method for stabilizing surface compressive stress of chemically-tempered glass provided in the present invention comprises the steps of:

arranging a plurality of pieces of the glass vertically in a holder made of stainless steel;

laying the stabilizer in a carrier made of stainless steel;

placing a plurality of the holders in a basket made of stainless steel;

fixing the carrier onto the basket; and placing the basket slowly in the tempering furnace.

In the method for stabilizing surface compressive stress of chemically-tempered glass provided in the present invention, the carrier is fixed at a bottom of the basket.

In the method for stabilizing surface compressive stress of chemically-tempered glass provided in the present invention, the carrier comprises:

a cubic storage case formed of a steel plate and a steel mesh for holding the stabilizer;

a cubic frame structure formed of steel bars, a plurality of the storage cases being positioned in the steel frame structure.

In the method for stabilizing surface compressive stress of chemically-tempered glass provided in the present invention, the basket has a plurality of cubic storage lattices, and each of the plurality of the holders is correspondingly positioned in each of the plurality of the storage lattices.

In the method for stabilizing surface compressive stress of chemically-tempered glass provided in the present invention, a pulling portion is provided at a top of the basket, which is connected to a mechanism for lifting or lowering the basket.

Compared with the prior art, the method for stabilizing surface compressive stress of chemically-tempered glass provided in the embodiments of the present invention has the following beneficial effects. Glass to be tempered is placed together with a stabilizer in a tempering furnace containing a molten salt bath for glass tempering, and the presence of the stabilizer allows the impurity ion content in the molten salt bath for glass tempering to be stable, whereby the concentration of potassium nitrate in the molten salt bath is ensured to be stable, thus ensuring that the CS value of the chemically-tempered glass is stabilized in a required range, and solving the problems existing in the prior art of enhanced production cost, lowered production efficiency, and exacerbated environmental pollution caused by frequent replacement of potassium nitrate in the production of chemically-tempered glass.

DETAILED DESCRIPTION

The technical problem to be solved in the present invention is that in a practical production process of tempered glass in a molten salt bath containing potassium nitrate, the CS value of the tempered glass is caused to decrease by gradually increased sodium, lithium, and other impurity ion concentrations and gradually decreased potassium nitrate concentration in the molten salt bath containing potassium nitrate. Because with increasing number of glass products fed to the molten salt bath containing potassium nitrate, the sodium ions and lithium ions on the glass surface unceasingly enter into the molten salt bath containing potassium nitrate by ion exchange reaction. The following technical solution is employed in the present invention for solving the above technical problem. A method for stabilizing the tempering capability of a molten salt bath containing potassium nitrate for chemical tempering of glass is provided. The core idea is: placing glass to be tempered together with a stabilizer in a tempering furnace containing a molten salt bath for glass tempering. The presence of the stabilizer allows the impurity ion content in the molten salt bath for glass tempering to be stable, whereby the concentration of potassium nitrate in the molten salt bath is ensured to remain at a high level stably. Therefore, the strength of the chemically tempered glass is improved, the replacement frequency of potassium nitrate is reduced, the production cost is lowered, the operation rate of the equipment and the productivity during the production of chemically tempered glass are improved, and the environmental pollution is alleviated, as compared with the prior art.

To make the technical objects, technical solutions and technical advantages of the present invention clearer, and facilitate the understanding and practice of the present invention by those skilled in the art, the present invention will now be described in further detail with reference to the accompanying drawings and specific examples.

An on-line method for stabilizing surface compressive stress of chemically-tempered glass provided in the present invention comprises the following steps.

(1) A molten salt bath for chemical tempering of glass is prepared. A salt containing solid potassium nitrate is added to a tempering furnace, heated to 380-450° C. to melt the salt into a molten liquid, and stirred until uniform, to obtain a molten salt bath for chemical tempering of glass.

(2) Several pieces of glass to be tempered are vertically arranged in a holder made of stainless steel. The holder is provided with two floors, and each floor can hold 30 to 40 pieces of the glass to be tempered. There is a gap between the adjacent two pieces of glass, thereby ensuring that the surface of each piece of glass is in full contact with the molten salt bath for chemical tempering of glass.

(3) 20 to 40 holders in which the glass to be tempered is arranged are placed in a basket made of stainless steel. The basket has 20 to 40 cubic storage lattices, and each of the holders is correspondingly positioned in each of the storage lattices. A pulling portion is provided at a top of the basket, which is connected to a mechanism for lifting or lowering the basket.

(4) A stabilizer is laid in a carrier in an amount of 0.3-2% w/w of the molten salt bath for glass tempering. The stabilizer is a flake-like ion sieve material, including $SiO_2$, an auxiliary material and a functional metal oxide. As a ceramic matrix, $SiO_2$ is an essential component; the auxiliary material forms a covalent bond with $SiO_2$, to form the skeleton of the ion sieve network structure; and the functional metal oxide absorbs impurity ions in the molten salt bath for chemical tempering of glass by chemically reacting with the impurity ions in the molten salt bath for chemical tempering of glass. The carrier includes a cubic storage case formed of a steel plate and a steel mesh and a cubic frame structure formed of steel bars. The stabilizer is uniformly laid in the storage case, and then the storage case is positioned in the steel frame structure, to facilitate the addition and replacement of the stabilizer.

(5) The carrier is fixed at a bottom of the basket. In the process of tempering the glass, the impurity ions are more likely to accumulate in the molten salt bath for glass tempering in the middle to bottom part of the tempering furnace. The removal of the impurity ions from the molten salt bath for glass tempering can be facilitated by fixing the carrier filled with the stabilizer at the bottom of the basket.

(6) The basket is placed slowly in a preheating furnace, such that all the glass to be tempered in the basket is completely submerged in a molten liquid in the preheating furnace, and then the glass is preheated for 0.5-1 h at a temperature of 300-380° C.

(7) The basket is transferred slowly from the preheating furnace to the tempering furnace, such that all the glass to be tempered in the basket is completely submerged in the molten salt bath for glass tempering in the tempering furnace, and then the glass is subjected to ion exchange reaction for 3 to 5 hours at a temperature of 400-450° C.

(8) The basket is slowly lifted out of the tempering furnace, and then the glass is removed from the holder and rinsed, to obtain glass with a stress value falling within a stable range. Depending on the practical situations in production, the stabilizer in the carrier may be removed together with the batch of tempered glass and replaced, or reused with a next batch of glass to be tempered.

The present invention will be described in detail below with reference to specific examples.

EXAMPLE 1

This example provides an on-line method for stabilizing surface compressive stress of chemically tempered glass, which comprises the following steps.

(1) 100 kg of solid potassium nitrate is added to a tempering furnace, heated to 420° C. to melt the solid potassium nitrate into a molten liquid, and stirred until uniform, to obtain a molten salt bath for glass tempering.

(2) A first batch of glass to be tempered (where the glass model is Gorrila4 glass produced by Corning, US) is vertically arranged in a holder made of stainless steel. Each floor of the holder holds 30 pieces of glass to be tempered, and adjacent two pieces of glass are parallel to each other and have a distance of 10 cm therebetween.

(3) 30 holders in which the glass to be tempered is arranged are placed in a basket made of stainless steel. The basket has 30 cubic storage lattices, and each of the holders is correspondingly positioned in each of the storage lattices.

(4) A stabilizer is laid uniformly in a carrier made of stainless steel in an amount of 0.8% w/w of the molten salt bath for glass tempering. The stabilizer has a composition as shown in Table 1-1.

TABLE 1-1

Composition of the stabilizer in Example 1

| Component | | wt % |
|---|---|---|
| $SiO_2$ | | 35.0 |
| Auxiliary material | $B_2O_3$ | 10.0 |
| | $Al_2O_3$ | 10.0 |
| | $ZrO_2$ | 5.0 |
| | $Bi_2O_3$ | 15.0 |
| Functional metal oxide | $K_2O$ | 25.0 |
| In total | | 100.0 |

(5) The carrier is fixed at a bottom of the basket.

(6) The basket is placed slowly in a preheating furnace, and the glass is preheated for 0.5 h in open air at a temperature of 300° C.

(7) The basket is transferred slowly from the preheating furnace to the tempering furnace, such that all the glass to be tempered in the basket is completely submerged in the molten salt bath for glass tempering in the tempering furnace, and then the glass is subjected to ion exchange reaction for 5 hours at a temperature of 420° C.

(8) The basket is slowly lifted out of the tempering furnace, and then the glass is removed from the holder and rinsed, to obtain a first batch of tempered glass. At the same time, the stabilizer in the carrier is removed.

(9) A second batch of glass to be tempered is arranged in the holder, and renewed stabilizer is laid uniformly in the carrier in an amount of 0.8% w/w of the molten salt bath for glass tempering. The holders and the carrier are fixed in the basket again, and then Steps (6), (7), and (8) are repeated to obtain a second batch of tempered glass.

In this example, six batches of tempered glass are produced following the above steps, and average surface compressive stress of each batch of the tempered glass is determined, as shown in Table 1-2.

TABLE 1-2

Average surface compressive stress of each batch of the tempered glass obtained in Example 1

| Batch | Surface compressive stress/Mpa |
|---|---|
| First batch | 823 |
| Second batch | 821 |
| Third batch | 819 |
| Fourth batch | 822 |
| Fifth batch | 817 |
| Sixth batch | 818 |

The results obtained in practical production show that by means of the on-line method for stabilizing surface compressive stress of chemically tempered glass provided in the present embodiment, the surface compressive stress of each batch of tempered glass produced can be stabilized effectively in a range of 817 to 823 Mpa.

EXAMPLE 2

This example provides an on-line method for stabilizing surface compressive stress of chemically tempered glass, which comprises the following steps.

(1) A mixed solid salt containing 80 kg of potassium nitrate and 20 kg of sodium nitrate is added to a tempering furnace, heated to 450° C. to melt the solid salt into a molten liquid, and stirred until uniform, to obtain a molten salt bath for glass tempering.

(2) A first batch of glass to be tempered (where the glass model is Gorrila5 glass produced by Corning, US) is vertically arranged in a holder made of stainless steel. Each floor of the holder holds 30 pieces of glass to be tempered, and adjacent two pieces of glass are parallel to each other and have a distance of 10 cm therebetween.

(3) 30 holders in which the glass to be tempered is arranged are placed in a basket made of stainless steel. The basket has 30 cubic storage lattices, and each of the holders is correspondingly positioned in each of the storage lattices.

(4) A stabilizer is laid uniformly in a carrier made of stainless steel in an amount of 2% w/w of the molten salt bath for glass tempering. The stabilizer has a composition as shown in Table 1-1. The stabilizer has a composition as shown in Table 2-1.

TABLE 2-1

Composition of the stabilizer in Example 2

| Component | | wt % |
|---|---|---|
| $SiO_2$ | | 40.0 |
| Auxiliary material | $P_2O_5$ | 5.0 |
| | $B_2O_3$ | 4.5 |
| | $Al_2O_3$ | 5.0 |
| | $ZrO_2$ | 1.5 |
| | $Bi_2O_3$ | 2.0 |
| | $TiO_2$ | 2.0 |
| Functional metal oxide | $K_2O$ | 30.0 |
| In total | | 100.0 |

(5) The carrier is fixed at a bottom of the basket.

(6) The basket is placed slowly in a preheating furnace, and the glass is preheated for 0.5 h in open air at a temperature of 300° C.

(7) The basket is transferred slowly from the preheating furnace to the tempering furnace, such that all the glass to be tempered in the basket is completely submerged in the molten salt bath for glass tempering in the tempering furnace, and then the glass is subjected to ion exchange reaction for 5 hours at a temperature of 450° C.

(8) The basket is slowly lifted out of the tempering furnace, and then the glass is removed from the holder and rinsed, to obtain a first batch of tempered glass. The stabilizer in the carrier is not removed, and reused with a next batch of glass to be tempered.

(9) A second batch of glass to be tempered is arranged in the holder, and the holders are fixed in the basket again, and then Steps (6), (7), and (8) are repeated to obtain a second batch of tempered glass.

In this example, when a sixth batch of tempered glass is produced following the above steps, the stabilizer in the carrier is replaced, and added still in an amount of 2% w/w of the molten salt bath for glass tempering. In this example, ten batches of tempered glass are produced in total, and average surface compressive stress of each batch of the tempered glass is determined, as shown in Table 2-2.

TABLE 2-2

Average surface compressive stress of each batch of the tempered glass obtained in Example 2

| Batch | Surface compressive stress/Mpa |
|---|---|
| First batch | 823 |
| Second batch | 821 |
| Third batch | 819 |
| Fourth batch | 820 |
| Fifth batch | 817 |
| Sixth batch | 825 |
| Seventh batch | 820 |
| Eighth batch | 818 |
| Ninth batch | 817 |
| Tenth batch | 819 |

The results obtained in practical production show that by means of the on-line method for stabilizing surface compressive stress of chemically tempered glass provided in the present embodiment, the surface compressive stress of each batch of tempered glass produced can also be stabilized effectively in a range of 817 to 825 Mpa.

To sum up, the method for stabilizing surface compressive stress of chemically-tempered glass provided in the embodiments of the present invention has the following beneficial effects.

1. Glass to be tempered is placed together with a stabilizer in a tempering furnace containing a molten salt bath for glass tempering. The content of the active substance in the molten salt bath is allowed to be stable, because sodium, lithium and other impurity ions in the molten salt bath for glass tempering is absorbed by the stabilizer. In this way, the concentration of potassium nitrate in the molten salt bath is ensured to remain at a high level stably, thus ensuring that the surface compressive stress of the chemically-tempered glass is stabilized in a range of high level. Moreover, the problems existing in the prior art of enhanced production cost, lowered production efficiency, and exacerbated environmental pollution caused by frequent replacement of potassium nitrate in the production of chemically-tempered glass are all solved.

2. A holder, a carrier, and a basket are used as a vehicle for the glass to be tempered and for the stabilizer, which facilitate the mass charge and removal of the glass during production, and the replacement of the stabilizer.

It is to be understood that the above specific embodiments are merely illustrative and not restrictive and the present invention is not limited thereto, and that many variations can be made by one of ordinary skill in the art based on the teachings and without departing from the essence and the scope of the present invention as defined by the appended claims, which are within the scope of the present invention.

The invention claimed is:

1. An on-line method for stabilizing surface compressive stress of chemically-tempered glass, comprising the steps of:
    placing glass to be tempered together with a stabilizer in a tempering furnace containing a molten salt bath for glass tempering; and
    after reacting at a temperature for a period of time, removing the glass and the stabilizer from the tempering furnace;
    wherein the stabilizer includes $SiO_2$, an auxiliary material and a functional metal oxide; wherein the auxiliary material forms a covalent bond with $SiO_2$ to form a skeleton of an ion sieve network structure; and the functional metal oxide absorbs impurity ions in the molten salt bath for chemical tempering of the glass by chemically reacting with the impurity ions in the molten salt bath for chemical tempering of the glass;
    wherein the functional metal oxide is $K_2O$; and
    wherein the auxiliary material comprises $B_2O_3$, $Al_2O_3$, $ZrO_2$, and $Bi_2O_3$; or the auxiliary material comprises $P_2O_5$, $B_2O_3$, $Al_2O_3$, $ZrO_2$, $Bi_2O_3$, and $TiO_2$.

2. The on-line method for stabilizing surface compressive stress of chemically-tempered glass according to claim 1, wherein the stabilizer is present in an amount of 0.3-2% w/w of the molten salt bath for glass tempering.

3. The on-line method for stabilizing surface compressive stress of chemically-tempered glass according to claim 1, comprising the steps of:
    arranging a plurality of pieces of the glass vertically in a holder made of stainless steel;
    laying the stabilizer in a carrier made of stainless steel;
    placing a plurality of the holders in a basket made of stainless steel;
    fixing the carrier onto the basket; and
    placing the basket slowly in the tempering furnace.

4. The on-line method for stabilizing surface compressive stress of chemically-tempered glass according to claim 3, wherein the carrier is fixed at a bottom of the basket.

5. The on-line method for stabilizing surface compressive stress of chemically-tempered glass according to claim 3, wherein the carrier comprises:
    a cubic storage case formed of a steel plate and a steel mesh for holding the stabilizer;
    a cubic frame structure formed of steel bars, a plurality of the storage cases being positioned in the steel frame structure.

6. The on-line method for stabilizing surface compressive stress of chemically-tempered glass according to claim 3, wherein the basket has a plurality of cubic storage lattices, and each of the plurality of the holders is correspondingly positioned in each of the plurality of the storage lattices.

7. The on-line method for stabililizing surface compressive stress of chemically-tempered glass according to claim 3, wherein a pulling portion is provided at a top of the basket, which is connected to a mechanism for lifting or lowering the basket.

\* \* \* \* \*